United States Patent [19]

Green

[11] Patent Number: 4,992,215

[45] Date of Patent: Feb. 12, 1991

[54] POLYMER FIRE RETARDANT

[75] Inventor: Raymond W. Green, Vancouver, Canada

[73] Assignee: Tag Investments, Inc., Vancouver, Canada

[21] Appl. No.: 265,220

[22] Filed: Oct. 31, 1988

[51] Int. Cl.[5] ............................................. C09K 21/00
[52] U.S. Cl. .................................. 252/609; 252/601; 252/7; 106/18.14; 106/18.31; 106/18.11
[58] Field of Search ................... 252/609, 7, 601, 606; 106/18.14, 18.31

[56] References Cited

U.S. PATENT DOCUMENTS

| | | | |
|---|---|---|---|
| 2,287,597 | 6/1942 | Brookes | 260/248 |
| 2,464,342 | 4/1949 | Pollak | 117/137 |
| 2,514,268 | 7/1950 | Walter | 260/17.3 |
| 2,536,988 | 12/1951 | Vartanian | 260/15 |
| 3,839,239 | 10/1974 | Godfried | 252/609 |
| 3,955,987 | 5/1976 | Schaar et al. | 106/15.05 |
| 4,174,343 | 11/1979 | Hardy et al. | 260/45.75 B |
| 4,184,311 | 1/1980 | Rood | 252/7 |
| 4,224,169 | 9/1980 | Retana | 428/921 |
| 4,312,802 | 1/1982 | Anspon | 260/33.6 AQ |
| 4,346,012 | 8/1982 | Umaba et al. | 252/7 |
| 4,382,884 | 5/1983 | Rohringer et al. | 252/606 |
| 4,438,028 | 3/1984 | Schmittmann et al. | 252/609 |
| 4,574,154 | 3/1986 | Okamoto et al. | 544/192 |
| 4,588,510 | 5/1986 | Salyer et al. | 252/5 |
| 4,719,045 | 1/1988 | Ogawa et al. | 252/609 |
| 4,727,102 | 2/1988 | Scarso | 524/100 |
| 4,729,853 | 3/1988 | von Bonin | 252/601 |

FOREIGN PATENT DOCUMENTS 1603123  11/1981  United Kingdom .

Primary Examiner—Howard J. Locker
Attorney, Agent, or Firm—Klarquist, Sparkman, Campbell, Leigh & Whinston

[57] ABSTRACT

This invention is directed to a novel formulation which is useful as a fire retardant in polymers such as polyethylenes, polypropylenes, polystyrenes, and nylons. A fire retardant formulation useful for lending fire retardant properties to synthetic polymeric materials comprising a solid composition precipitated from an aqueous mixture of a sulfate or phosphate oxyacid, an amine, and a surfactant.

6 Claims, No Drawings

POLYMER FIRE RETARDANT

FIELD OF THE INVENTION

This invention is directed to a novel formulation which is useful as a fire retardant in polymers such as polyethylenes, polypropylenes, polystyrenes, and nylons.

BACKGROUND OF THE INVENTION

Rising expectation for public safety have prompted governmental agencies to review the regulations and legislation that pertain to the flammability and smoke hazards that are associated with ignited artificial polymeric materials. Particular emphasis has been directed to thermoplastic materials that are produced by rapid extrusion manufacturing processes. Commercially available fire retardants for extruded polymeric materials are primarily halogenated hydrocarbons and exhibit at least five major disadvantages: (1) they are intrinsically toxic, (2) they retard fire only after being vaporized by the action of heat, (3) they produce corrosive and highly toxic vapors, (4) they do not suppress smoke which is known to be a leading cause of death by fire, and (5) they often require the presence of antimony oxide which is now known to be a dangerous carcinogenic compound. To improve the situation, the United States National Materials Advisory Board has recommended the development of char forming fire retardants which reduce or eliminate all forms of vaporization upon exposure to fire.

Efforts have been made to develop non-halogenated hydrocarbon type fire retardants for extrudable thermoplastics. U.S. Pat. No. 4,174,343, issued November 13, 1979, W. B. Hardy et al., discloses a polyolefin composition containing, as a fire retardant, a combination of a disphosphonate, and ammonium polyphosphate. Also disclosed is a polyolefin composition containing 20-40 wt. % dicyanopentaerythritol diphosphonate. The retardant is especially used to render homopolypropylene flameretardant, but copolymers with 10-15% ethylene or (iso)butylene are also applicable.

U.S Pat. No. 4,312,802, granted January 26, 1982, G. Bertelli, discloses a self-extinguishing polymer composition comprising (a) 100 parts of a thermoplastic polymer, (b) 5 to 30 parts of an ammonium or aminophosphate and (c) 3 to 20 parts of an N-containing organic compound which on heating in the presence of component (b) forms a carbonaceous non-dripping mass. The fire retardant system can be used with olefin (co)polymers such as polypropylene, polyethylene, ethylene-propylene copolymers, polystyrene, ABS, polyethylene terephthalate, polybutylene terephthalate, polycarbonates and polyamides. They purportedly give good self-extinguishing properties and do not cause corrosion of processing apparatus or generate toxic smoke and gases on ignition.

British Pat. No. 1,603,123, granted November 18, 1981, Johnson Trading Co., discloses a flame-proofing and fireretarding composition comprising an aqueous solution of (a) ammonium hydrogen sulphate, (b) ammonium dihydrogen phosphate and (c) diammonium hydrogen phosphate. It can also be in the form of an anhydrous mixture for dissolution in water. The composition can contain a binder, for example, an alkali metal silicate (up to 1 wt. %); a water-repellant additive such as sodium stearate (up to 0.5 wt. %); an additional ammonium salt, for example, sulphamate or meta-borate (up to 4 wt.%); a hypochlorite salt (up to 0.01 wt. %); a chloride salt (wt. ratio of hypochlorite to chloride 1:8 to 20): and $Na_2HP)_4$. The composition is said to provide "balanced" protection against flame spread and melt whilst meeting health and hygiene requirements.

U.S. Pat. Nos. 2,287,597, 1943, 2,464,342, 1949, 2,514,268, 1950, and 2,536,988, 1951 disclose melamine containing fire retardants.

SUMMARY OF THE INVENTION

The invention is directed to a fire retardant formulation useful for lending fire retardant properties to synthetic polymeric materials comprising a mixture of a phosphate, an amine and a surfactant.

A fire retardant formulation useful for lending fire retardant properties to polymers comprising a solid composition precipitated from an aqueous mixture of an oxyacid selected from the group consisting of phosphoric acid, ammonium dihydrogen phosphate, diammonium hydrogen phosphate, sulfuric acid, and ammonium hydrogen sulfate, an amine selected from the group consisting of ethylenediamine, p-phenylenediamine, m-xylene-$\alpha,\alpha'$-diamine, 2,4,6-triamino-1,3,5-triazine, 2-aminopyridine, and diethylenetriamine and, urea, and a surfactant selected from the group consisting of sodium lauryl sulfate, polyvidone, sodium alkylbenzenesulfonate, sodium palmitate and a detergent available under the trade mark "Tide".

A fire retardant formulation useful for lending fire retardant properties to polymers comprising a solid composition precipitated from a mixture of ammonium dihydrogen phosphate, 2,4,6-triamino-1,3,5-triazine, and sodium lauryl sulfate.

A method of preparing a fire retardant additive useful for lending fire retardant properties to synthetic polymeric materials comprising preparing a solid composition precipitated from a mixture of three reagents each selected respectively from the group consisting of:
(a) about 30% to 70% of the total weight of the mixture of one of the following oxyacids: phosphoric acid, ammonium dihydrogen phosphate, diammonium hydrogen phosphate, sulfuric acid, ammonium hydrogen sulfate, or a mixture of these oxyacids;
(b) about 30% to 70% of the total weight of the mixture of one of the following amines: ethylenediamine, p-phenylenediamine, m-xylene-$\alpha,\alpha'$-diamine, 2,4,6-triamino-1,3,5-triazine, 2-amino pyridine, diethylenetriamine, and urea, or a mixture of these amines; and
(c) about 0.25% to 10% of the total weight of the mixture of one of the following surfactants: sodium lauryl sulfate, polyvidone, and common detergents such as "Tide" (trade mark) or a mixture of these surfactants;
which method comprises dissolving the oxyacid in a minimum volume of boiling water, adding the amine and surfactant to the boiling water and oxyacid, heating and stirring the boiling mixture until the solid composition has completely precipitated, filtering the composition from the mixture, and grinding the composition finely into the fire retardant additive.

DETAILED DESCRIPTION OF SPECIFIC EMBODIMENTS OF THE INVENTION

The present invention is a char forming fire retardant designed to prevent all forms of vaporization particularly in hydrophobic, polymeric materials such as polyethylene, polypropylene, polystyrene, nylon, ABS, latex, synthetic rubber and the like.

The subject char forming retardant has been formulated to be compatible with most plastic manufacturing processes and tolerant of the relatively high temperatures commonly required for plastic moulding or extrusion but capable of providing char forming fire retardance when challenged by a flame. The retardants of the invention can withstand the 350 to 550 deg. F temperatures that are encountered in thermoplastic injection molding machines without becoming unstable or detracting from the fire retardant properties.

The char forming fire retardant of the invention in general terms comprises a solid composition precipitated from an aqueous mixture of an oxyacid, an amine, and a surfactant. The retardant is not volatile when decomposed and polymers containing the retardant have retained about 99 percent of their weight upon exposure to flame. Normally, a flammable polymer would reduce to 5 to 10 percent ash upon exposure to flame.

Suitable oxyacids include phosphoric acid, ammonium dihydrogen phosphate, diammonium hydrogen phosphate, sulfuric acid and ammonium hydrogen sulfate or the hydrated forms of these oxyacids.

Suitable amines include ethylenediamine, p-phenylenediamine, m-xylene-α,α'-diamine, 2,4,6-triamino-1,3,5-triazine, 2-aminopyridine, diethylenetriamine and urea.

Suitable surfactants include sodium lauryl sulfate, polyvidone, sodium alkylbenzenesulfonate, sodium palmitate and a detergent available under the trade mark "Tide".

A number of the chemical compounds listed above have alternative names. For purpose of this disclosure, and to assist in understanding the invention, ammonium dihydrogen phosphate is also known as monobasic ammonium phosphate, diammonium hydrogen phosphate is also known as dibasic ammonium phosphate, ethylenediamine is also known as 1,2-ethane diamine, polyvidone is also known as 1-vinyl-2-pyrrolidinone polymer or poly[1-(2- oxo-1-pyrrolidinyl) ethylene], ammonium hydro known as ammonium bisulfate, and urea is also known as carbonyl diamide.

The inventor has identified a group of amines which add chemically to various acid forms of sulfate and/or phosphate to form insoluble products which exhibit the char forming catalytic action typical of phosphate and sulfate, and which exhibit high thermal stability as well as the ability to blend with various plastics in a homogeneous manner.

While the inventors do not wish to be bound by theory or helpful commentary, many of the addition products identified appear to be nonstoichiometric in that fixed quantities of the amines named add variable quantities of acid phosphate and/or acid sulfate. In particular, 2,4,6-triamino-1,3,5-triazine and ammonium dihydrogen phosphate have been examined in detail for nonstoichiometric addition. In this case, the phosphate exhibits two acid protons and the amine exhibits three amino groups. Clearly, the acid protons can hydrogen-bond to the basic amino groups in a broad range of combining ratios. In one extreme, each dihydrogen phosphate hydrogen-bonds to two molecules of 2,4,6-triamino-1,3,5-triazine. In a second extreme, each 2,4,6-triamino-1,3,5-triazine hydrogen-bonds to three dihydrog phosphate anions. In the first extreme, uncombined amino groups are maximum and in the second extreme uncombined phosphate acid protons are maximum. A likely combining ratio rises from a sheet-like structure where each 2,4,6-triamino-1,3,5-triazine is hydrogen-bonded to three dihydrogen phosphate and each dihydrogen phosphate is bonded to two 1,3,5-triamino-2,4,6-triazine molecules. This structure requires that two 1,3,5-triamino-2,4,6-triazine combine with three ammonium dihydrogen phosphates. These theoretical considerations explain the nonstoichiometry discovered for the compounds described in this application, and these comments explains why the active fire retardant agents are not described as pure chemical compounds.

An effective formulation combines 57% by weight of ammonium dihydrogen phosphate, 42% by weight of 2,4,6-triamio-2,4,6-triazine, and 1% by weight "Tide" (brand name) detergent in the minimum volume of boiling water required to dissolve the phosphate. The resultant precipitate is filtered, dried and finely ground into a usable retardant.

Other effective detergents are sodium alkylbenzenesulfonate and sodium palmitate.

Another preferred formulation combines 57% by weight of ammonium dihydrogen phosphate, 42% by weight of 1,3,5-triamino-2,4,6-triazine, and 1% by weight of polyvidone in the minimum volume of boiling water required to dissolve the phosphate. The resulting precipitate is filtered, dried and finely ground into a usable retardant.

A further preferred formulation combines 43% by weight of phosphoric acid, 56% by weight of 2,4,6-triamino-2,4,6-triazine, and 1% of polyvidone.

EXAMPLE

Laboratory Production of Fire Retardant

One mole (126 g) of Melamine powder (obtained from American Cyanamide) was sprinkled into a hot solution (100 deg. C) of two moles (230 g) of ammonium dihydrogen phosphate dissolved in a minimum volume (133 g) of boiling water. The mixture was heated and stirred for about 20 minutes. The white precipitate was filtered and dried giving 318 g of product which melted sharply at 310 deg. C.

About nine pounds of low density polyethylene (LDPE) and about one pound of melamine phosphate (MP) (the white precipitate obtained from the previous reaction) was blended at 350 deg. F without surfactants. The product was found to pass UL94HB as well as parts C, D and E of UL94-5V tests for flammability of plastic materials. Untreated polyethylene fails all these flammability tests by a wide margin.

The flammability tests conducted use tiles measuring 2.5 by 0.5 by 0.12 inches were extruded from pure LDPE and LDPE containing ten weight percent of a coarse grade of MP. Microscopic examination of LDPE-MP blend indicated adequate but imperfect blending due to inadequate grinding of the MP and exclusion of a suitable surfactant from the mix.

The standard tests described in the next two paragraphs are formally conducted using tiles measuring 5.0 by 0.5 by 0.25 inches or 6.0 by 6.0 by 0.25 inches.

The Horizontal Burning Test, UL94HB, determines the burning rate when the edge is challenged for 30 seconds with a Bunsen burner flame. Untreated LDPE burns at a rate of 5 inches per minute with additional flame spread due to flaming drips. It was discovered that LDPE containing ten percent MP burned at 1.2 inches per minute without flame spread due to flaming drips. The UL94HB test requires only a rate of burning of less than 3.0 inches per minute for samples thinner than 0.125 inches.

The Vertical Burning Test, UL94-5V, measures the duration of flaming after (a) the lower corner, (b) the lower edge, (c) the side edge, (d) the top surface, and (e) the bottom surface are challenged with a Bunsen burner flame using five separate five second applications. The test is passed if burning ceases within 60 seconds without flaming drips. Untreated LDPE burns to completion with flaming drips in all tests. It was found that LDPE containing 10 percent MP minimally failed tests (a) and (b), minimally passed test (c), and easily passed tests (d) and (e). In tests (a), (b) and (c), LDPE-MP showed only a thin trace of flame along the challenged edge, and this thin trace of flame would immediately extinguish with the slightest draft due to talking or a motion of the hand. By contrast, untreated LDPE burns vigorously to completion with flaming drips even in a moderate draft. In tests (d) and (e), LDPE-MP failed to ignite and showed no burning at all after the burner was withdrawn. Flaming drips, observed in all tests using untreated LDPE, were not observed in any test using the MP treated form of LDPE.

Low-density polyethylene burns vigorously when challenged by a flame primarily due to its low melting point which permits flame spread by means of liquid flow. Melamine phosphate (MP) does not alter this low melting point but it does form sufficient char to restrict combustion and subsequent flow due to melting.

Polyethylene, polypropylene, and nylon containing 15% by weight of melamine phosphate retardant which contains one percent by weight of sodium alkylbenzenesulfonate passed the UL94HB burn test as well as all five parts of the UL94-5V burn tests.

Process Procedures

Incorporating fire retardant materials such as those described in this application into plastic materials is conducted by mixing finely divided retardant with melted plastic. Important factors in achieving a market quality product include the particle size of the retardant, the choice of surfactant material used in the production of the retardant, and finally the particle size of the feedstock plastic.

First, the retardant must be ground to a particle size less than fifty microns or in some applications less than five microns. There are two reasons for this specification. The fire retardant acts as a heterogeneous catalyst so that the effect depends on surface area of the retardant. Fine particles have a larger surface area than coarse ones. As well, coarse retardant particles degrade the physical appearance and physical properties of the resultant product.

Secondly, the retardant must contain about one percent by weight of surfactant to prevent agglomeration of the retardant when it is blended with the melted plastic. The choice of surfactant depends upon the type of plastic being fire retarded.

Thirdly, the feedstock plastic must be cut or ground to a particle size of less than 1000 microns to obtain a homogeneous blend of plastic and retardant when the plastic and retardant are mixed in the melt. This requirement rises primarily from the commercial need to minimize the duration of the melt-time.

Fire retarded plastic materials will contain between five and twenty percent by weight of retardant. As a rule, plastic containing twenty percent by weight of the retardants described in this application are self extinguishing so that little is gained by using higher weight percentages. Also plastics containing less than five percent by weight of retardant show an insignificant improvement in flammability.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A fire retardant formulation for synthetic polymeric materials comprising a solid composition precipitated from an aqueous mixture of a water-soluble phosphate or sulfate oxyacid selected from the group consisting of phosphoric acid, ammonium dihydrogen phosphate, diammonium hydrogen phosphate, sulfuric acid, ammonium hydrogen sulfate, or a mixture of these substances, a water-soluable amine selected from the group consisting of ethylenediamine, p-phenylenediamine, m-xylene-α, α'-diamine, 2,4,6-triamino-1,3,5-triazine, 2-aminopyridine, diethylenetriamine, and urea, or a mixture of these amines, and a water-soluble surfactant selected from the group consisting of sodium lauryl sulfate, polyvidone, sodium alkylbenzenesulfonate and sodium palmitate, or mixtures of these surfactants.

2. A composition as recited in claim 1 wherein the weight of the oxyacid is between about 30% and 70% of the total weight of the composition.

3. A composition as recited in claim 1 wherein the weight of the amine is between about 30% and 70% of the total weight of the composition.

4. A composition as claimed in claim 1 wherein the surfactant is between about 0.25% and 10% by weight of the total weight of the composition.

5. A formulation as recited as in claim 1 where the oxyacid comprises 57% to 66% by weight of ammonium dihydrogen phosphate, 42% to 33% by weight of 2,4,6-triamino-1,3,5-triazine and 1% by weight of sodium alkylbenzenesulfonate.

6. A method of preparing a fire retardant additive for synthetic polymeric materials comprising preparing a solid composition precipitated from a mixture of three reagents each selected respectively from the group consisting of:
   (a) about 30% to 70% of the total weight of the mixture of one of the following oxyacids: phosphoric acid, ammonium dihydrogen phosphate, diammonium hydrogen sulfate, or a mixture of these oxyacids;
   (b) about 30% to 70% of the total weight of the mixture of one of the following amines: ethylenediamine, p-phenylenediamine, m-xylene-α, α', -diamine, 2,4,6-triamino-1,3,5-triazine, 2-aminopyridine, diethylenetriamine, and urea, or a mixture of these amines; and
   (c) about 0.245% to 10% of the total weight of the mixture of one of the following surfactants: sodium lauryl sulfate, polyvidone, alkylbenzenesulfonate, sodium palmitate or a mixture of these surfactants;

which method comprises dissolving the oxyacid in a minimum volume of boiling water, adding the amine and surfactant to the boiling water and oxyacid, heating and stirring the boiling mixture until the solid composition has completely precipitated, filtering the composition from the mixture, and grinding the composition into the fire retardant additive.

* * * * *